United States Patent
Wells

[11] Patent Number: 6,070,698
[45] Date of Patent: Jun. 6, 2000

[54] AIR LINE OILER

[76] Inventor: Robert Scott Wells, 2369 Dickerson Rd., Reno, Nev. 89503-4905

[21] Appl. No.: 08/877,131

[22] Filed: Jun. 17, 1997

[51] Int. Cl.⁷ ....................................................... F16N 7/34
[52] U.S. Cl. .......................... 184/55.2; 184/6.26; 239/344; 239/366; 261/71; 261/116
[58] Field of Search ................................. 184/6.26, 55.1, 184/55.2, 57, 58; 239/8, 344, 366, 368; 261/71, 116, DIG. 35

[56] References Cited

U.S. PATENT DOCUMENTS

| | | |
|---|---|---|
| 2,073,009 | 3/1937 | Hersey, Jr. et al. . |
| 2,172,092 | 9/1939 | Shepherd . |
| 2,227,278 | 12/1940 | Slater . |
| 2,456,270 | 12/1948 | Giwosky et al. . |
| 2,687,187 | 8/1954 | Lake . |
| 2,921,649 | 1/1960 | Wilkerson ............................. 184/55.2 |
| 2,966,312 | 12/1960 | Wilson, Jr. et al. . |
| 3,211,255 | 10/1965 | Miyazaki . |
| 3,720,290 | 3/1973 | Lansky et al. . |
| 3,841,438 | 10/1974 | Tine et al. . |
| 4,335,804 | 6/1982 | Bardin et al. . |

FOREIGN PATENT DOCUMENTS

| | | | |
|---|---|---|---|
| 662285 | 8/1929 | France ................................. | 184/55.2 |
| 1211848 | 3/1960 | France ................................. | 184/55.2 |
| 53918 | 6/1912 | Germany ............................. | 184/55.2 |
| 208412 | 12/1923 | United Kingdom ................. | 184/55.2 |
| 322955 | 12/1929 | United Kingdom ................. | 184/55.2 |

*Primary Examiner*—Christopher Verdier
*Attorney, Agent, or Firm*—Donald N. MacIntosh; Flehr Hohbach Test Albritton & Herbert LLP

[57] ABSTRACT

A lubrication system for furnishing an atomized lubricant from a liquid supply into a working air line delivering compressed air to a pneumatic tool includes a liquid reservoir subjected to the combined air line dynamic and static pressures and having an atomizing delivery nozzle projecting in the direction of air flow with a bore sufficient to permit the lubricant to weep there along and to be initially atomized therein before discharge as an aerosol in the working air stream.

7 Claims, 3 Drawing Sheets

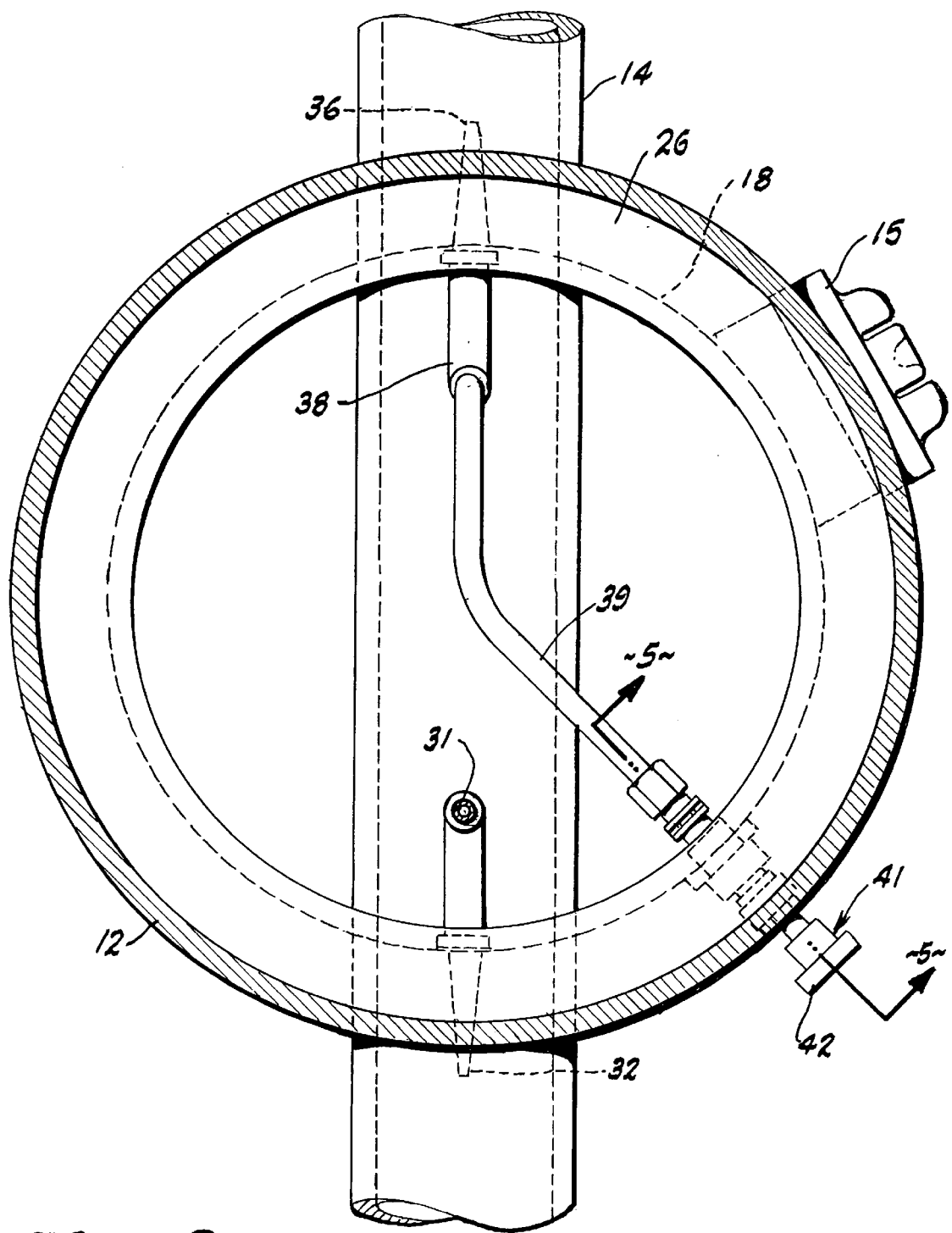
FIG_2

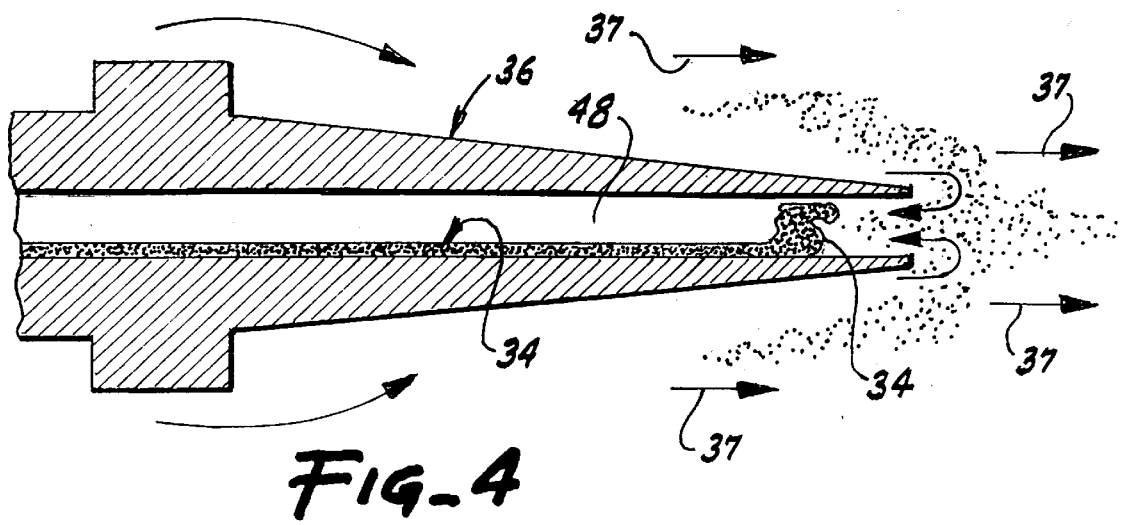
FIG_4
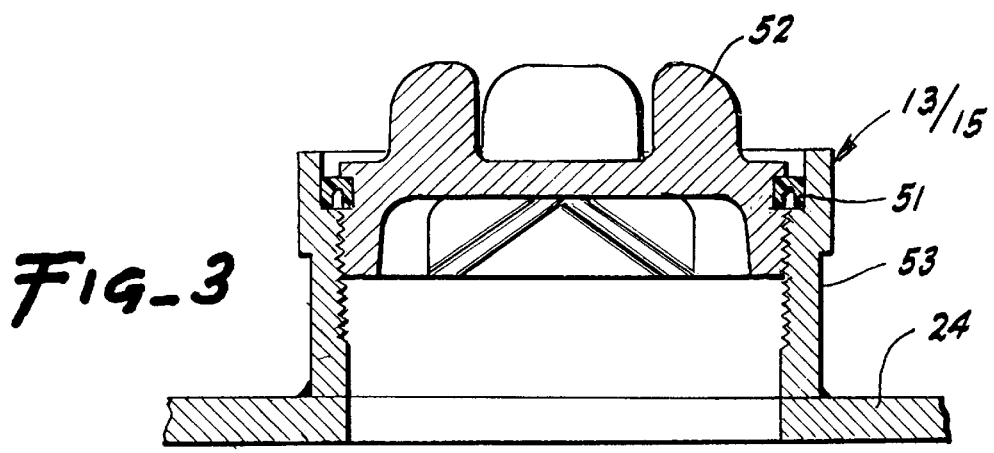
FIG_3
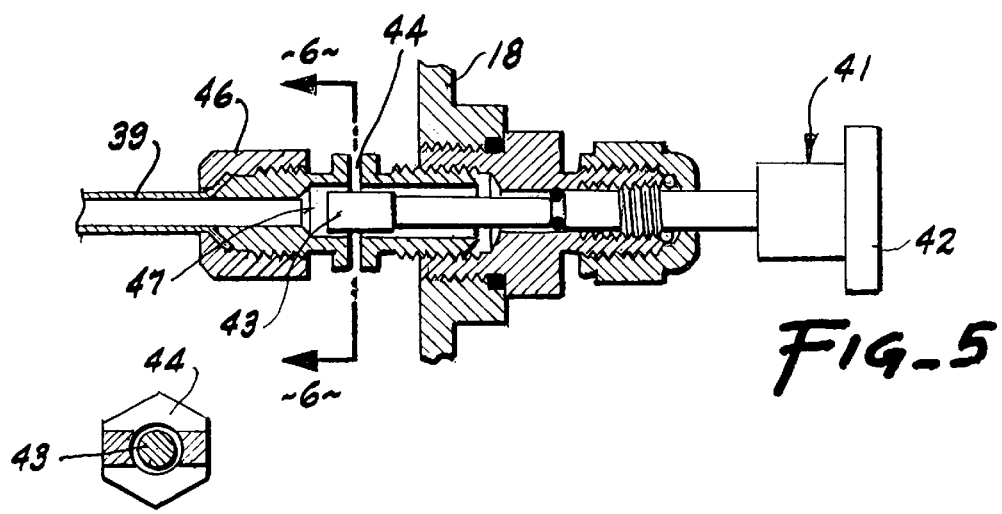
FIG_5
FIG_6

AIR LINE OILER

BACKGROUND OF THE INVENTION

This invention is directed to the field of lubrication for pneumatic tools and particularly relates to providing for a reliable source of atomized lubricant into the compressed air line connected to pneumatic tools such as rock drills, hammers, motors or the like.

Providing a reliable and consistent supply of lubricant into a working air line serving pneumatic tools has been a problem for a number of reasons. Certain lubricants, for example, tend to collect along the sidewalls of the working air line when injected therein in a large droplet form or in a partially atomized form. In this situation a film of lubricant will progress down the inside walls of the air line but will tend to collect principally along one side of the line and this is believed due in part to gravitational forces as well as the attractiveness between the wall surface and the lubricant and the driving forces of the moving air. Overall this results in inefficient delivery of the lubricant to the working tool. Air lines operating in the range of 150 to 500 psig and frequently up to 1,500 psig and flow rates on the order of 1500 cubic feet per minute are commonly employed to power and drive drills and other air tools for mining operations. High volume flow rates up to 30,000 cfm are not rare. Other applications needing reliable air delivered lubrication are air powered rock hammers such as those employed in coal, copper or gold mines as well as pneumatic motors. Failure of the air powered tools in every instance causes substantial problems in the field, including down-time for repair or replacement of the equipment including its removal and replacement from the work site. The replacement cost of a pneumatic hammer is substantial and exceeds the cost of the inventive apparatus disclosed herein.

In the prior art, the Bardin U.S. Pat. No. 4,335,804 discloses structure for forming an oil mist through generation of a vortex with the objective of directing the oil tangential to the direction of air flow. The Shepard U.S. Pat. No. 2,172,092 employs flow control of lubricant from a pressurized lubricant holding compartment through a needle valve. The Lansky U.S. Pat. No. 3,720,290 discloses dispersing oil in a path concentric with the axis of flow through the use of a supersonic whistle which converts the liquid oil into a mist. The Slater U.S. Pat. No. 2,227,278 also discloses the problem of lubricating oil depositing along the sidewalls of a conduit carrying the compressed air but addresses the problem through employment of the structure substantially different from that disclosed herein. Furthermore, mechanical moving parts, springs, severe air line restrictions and exposed areas prone to becoming plugged by contaminant particles characterize the deficiencies of this prior art.

SUMMARY OF THE INVENTION AND OBJECTS

In summary, the invention resides in an air line oiler including a reservoir to hold a supply of liquid lubricant at and somewhat above the working pressure of the working air line and being supported on a base through which a first air conduit extends equipped for connection to the air line. An air inlet nozzle or intake orifice is positioned in the air conduit facing in a direction opposite to that of the air flow and inter-connected to the liquid reservoir so as to pressurize the reservoir at the line pressure. A lubricant delivery nozzle is positioned in axially in the central portion of the first air conduit and oriented to project substantially in the direction of air flow and a fluid conduit interconnects the delivery nozzle to the liquid reservoir affording lubricant flow to the delivery nozzle. A metering valve is arranged in the fluid conduit for regulation of the flow of lubricant from the reservoir to the delivery nozzle, the bore of which is sized to permit the lubricant to weep along the fluid conduit to coalesce inwardly of the nozzle end so that the onrushing air in the conduit withdraws lubricant from the bore in an atomized form for entrainment into the working air line for delivery to the pneumatic tool.

A general object of the invention is to provide a fail proof air line oiler for supplying rock oil in a working air line serving an air tool such as rock drill or the like remote from the oiler, the oil being supplied as an airborne mist entrained in the working air.

Another object of the invention is to provide at a positive feed pressure under constant demand a reliable source of lubricant to a working air line by inserting the lubricant in the form a mist into the airline in a central location so as to be carried to the working location with minimal deposit of the lubricant on the conduit walls.

Another object of the invention is to generate a mist of lubricating oil from a liquid supply in an efficient reliable manner.

Yet another object is to provide a rock oiler of the type described in which the supply of liquid lubricant is maintained at least at substantially the same or above the pressure as is present in the working air line and wherein the liquid lubricant is converted into an aerosol as needed in the high working air volumes demanded for the tools in the air power system.

A further object is to provide for working at relatively high working pressures an airline lubricator which is efficient in design for ease of access to all components for rapid service to any internal component without disassembly of the housing and which is readily installed in a pneumatic system for a long working life.

These and other objects will become apparent from the disclosure which follows including the illustrative drawings and the description of a preferred embodiment of this invention.

BRIEF DESCRIPTION OF THE DRAWINGS

FIG. 1 is a sectional view in elevation showing the air line lubricator of the present invention and illustrating in schematic form the connection of the lubricator with a working air line extending between an air compressor (or other source of compressed air) and at least one pneumatic tool, motor or the like;

FIG. 2 is a sectional view in plan taken in the direction of the arrows 2—2 of FIG. 1 but displayed on an enlarged scale;

FIG. 3 is a sectional view taken in the direction of arrows 3—3 from FIG. 1;

FIG. 4 is an enlarged, reversed sectional view taken in the direction of arrows 4—4 of FIG. 1;

FIG. 5 is a sectional view taken in the direction of the arrows 5—5 from FIG. 2; and FIG. 6 is a sectional view taken in the direction of the arrows 6—6 in FIG. 5.

DESCRIPTION OF A PREFERRED EMBODIMENT

Figure 1:
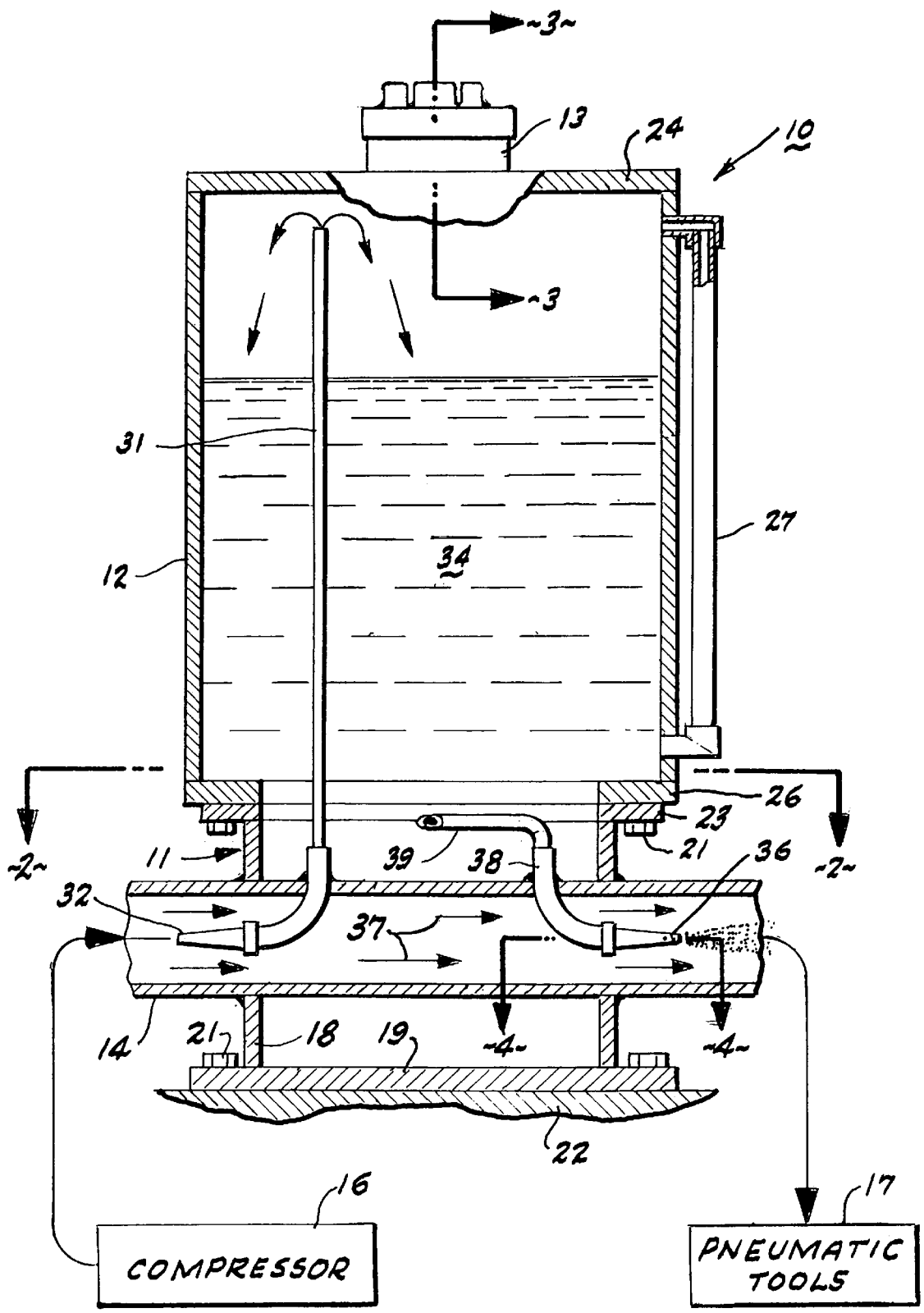

One preferred embodiment 10 of an air line oiler made in accordance with and embodying the principles of the present invention is shown generally in FIG. 1. The air line oiler or fluid injector 10 includes a support base 11, a tank or reservoir 12 having a fill port 13 in an upper region and a principal air-flow line or conduit 14 mounted in the base 11. In the operative condition, the air conduit line 14 is arranged in communication with an air compressor 16 and one or more pneumatic tools 17, these being indicated schematically in FIG. 1. The conduit 14 is equipped with appropriate coupling elements (not shown) for mounting the oiler 10 in a compressed air line which may be typically of nominal 2-inch to 6-inch diameter in size, although the air line fluid injector 10 is applicable to compressed air conduit systems as large as 12 inches nominal diameter. Typically, working pressures in compress air lines for which the invention is most effective are on the order of 125 through 1500 psi with air velocities at 10 to 80 feet per second.

The support base 11 is formed from a cylindrical, high strength metal tube 18, which is the upright member of the base, and a baseplate 19 to which the tube 18 is fixedly secured as by welding. The base plate 19 in turn includes apertures (not shown) for receiving fasteners, such as bolts 21, for securely mounting the unit 10 to an associated support structure 22. Internally and in service conditions the base also serves as a relatively large water and particle trap, not found in existing designs. A typical capacity of the trap is on the order of 30 pounds of sand or the like. An upper connection ring 23 is fixedly secured to the tube member 18 and serves to provide a support surface for mounting the reservoir 12 to the base 11. Suitable fasteners 21 are provided for this attachment of the reservoir to the support base. The delivery conduit 14 extends through the upright base tube 18 and is fixedly secured, as by welding, to the tubular member 18.

The reservoir or tank 12 for containing the lubricant to be dispersed is designed and constructed to resist the high line pressures in the compressed air line and in some respects may be considered to be a pressure vessel, although not specifically designed to pressure vessel codes. To this end, the sidewalls on the tank 12 may be formed of metal of suitable thickness welded to the top plate 24 into which the fill port 13 is mounted. A mounting ring 26 is secured to the side walls at the bottom of the tank for pressure tight connection with the ring 23 of the base. A liquid level sight glass 27 is mounted in the side wall of the tank 12 to enable a visual determination of the liquid level within the tank while it is under the operative line pressure. Referring particularly to FIGS. 1, 2 and 3, the fill port 13 and access port 15 are similarly constructed and are equipped with pressure seals 51 which are caused to expand under the pressure within the unit 10 to fit snugly in the recess provided in the plug 52 and the riser 53. Once pressurized, the seals expand and lock the plug into position. Similarly, when the unit is depressurized, the plug may be removed quite easily so that lubricant may be added to the reservoir or, in the case of the access port 15, cleaning activities may be undertaken as well as to service the components accessible therein for the removal of any debris which may have been captured in the lower portion of the base 18. A lateral access port 15 is mounted in the sidewall 18 of the base, as shown in FIG. 2, to permit access for service and adjustment of the internal components positioned within the base as well as to permit clean out and draining of the unit.

It will be understood that the unit 10, its base support and reservoir tank 12, the fill port 13 and access port 15 are all designed and constructed to withstand the full line pressure of the compressed air line into which the unit 10 is coupled. For pressurization of the unit an air inlet line 31, including a nozzle 32, is disposed substantially co-axially within the principal conduit 14. The inlet line 31 is in communication with an upstanding air delivery tube 32 which ends rather close to the top plate 24 of the reservoir tank 12, as shown best in FIG. 1. Thus, the supply of lubricating fluid such as rock oil 34, while completely filling the tank and base, will have its upper liquid level disposed slightly below the upper end of the tube 31. This relationship has been found to eliminate foaming of the liquid oil lubricant such as when the unit is depressurized for refilling. Air does not bubble through the liquid and is always delivered with the tube 31 above the top surface of the liquid.

An oil delivery nozzle 36 is disposed substantially axially in the principal conduit 14 and oriented in the direction parallel to the velocity flow of the compressed air as indicated by the arrows 37 in FIG. 1. The air intake nozzle 31, on the other hand, projects upstream and is thus enabled to supply the tank 12 with air pressure including the velocity head as well as the static head of the air moving in the working line.

The oil delivery nozzle 36, best shown in FIGS. 1 and 4, is mounted on a support tube 38, preferably made of copper for heat conduction purposes, which extends through the wall of the conduit 14 and is equipped with an oil pickup tube 39 which is in communication with a metering or flow control valve 41, FIGS. 2 and 6. The metering valve 41 projects through the upright tube wall 18 and is equipped with an externally accessible adjustment knob 42 serving to permit rotation of a metering needle 43 for controlling flow into a metering port 44 which opens to the reservoir or tank 12. The lubricant pickup tube 39 is mounted to the metering valve 41 through the fitting 46. With this construction, lubricant flows into the metering port 44 from the tank 12 and into the valve flow chamber 47 and, depending upon the rotational position of the plug or needle 43, there will be provided flow space for the lubricant to move from the tank into the pickup tube 39. It will be understood that oil is subjected to the full air line pressure which is present in the tank as well as the velocity head pressure created by the moving air with respect to the intake nozzle 32.

Due to the circumstance that pneumatic power systems operate at different gross demand rates, the control or metering valve 41 is a useful component to enable compensation for different pressures, flow rates, lubricant fluid viscosities, ambient temperatures and pressures as well as the ambient altitude where the unit is situated. Moreover, in certain oil exploration applications, the use of the metering valve 41 is important to restrict the amount of lubricating oil migrating into the target ore sample being recovered. It will be appreciated that the control or metering valve 41 is adjustable externally of the unit 10, and is effective to allow the operator to fine-tune the injection rates of oil into the lubricating system all the while the unit is on-line.

The construction and arrangement of the air inlet nozzle 32 and lubricant delivery nozzle 36 with its attendant control valve 41 and tubing arrangement enables a flow of lubricant 34 in the manner illustrated in FIG. 4 which depicts an air space 48 in the flow channel located behind the coalesced lubricant at the nozzle tip over which the high-velocity compressed air passes. The air space or pocket 48 exists due to the high-velocity air moving in the direction of the arrows 37 away from the nozzle tip and creates a pressure differential or draw from 0 to 6 inches of mercury column due solely to the air volumes demanded by the working air tools and the velocity of the compressed air. The moving air "wicks" the wall of coalesced oil at the nozzle tip and finely atomizes the lubricating oil into small particles and carries those along into the air stream.

OPERATION

For the purpose of describing the operation of the air line oiler 10 it will be first assumed for example that the compressor 16 is supplying air to a 2-inch air line 14 at 350 psi at the rate of 750 cubic feet per minute. The tank or reservoir 12 is filled with lubricant 34 at least above the inlet port of the valve 41 and preferably to the one half-liquid level. The control or metering valve 41 is adjusted to permit flow from the tank to the delivery nozzle 36. In the initial starting pressurization of the system from 0 psi to 350 psi, the compressed air enters the inlet nozzle 32 coupled to the air delivery line 31 and pressurizes the reservoir 12 to the line pressure as well as accepting the initial velocity head. Assuming no demand for working air from the pneumatic tools 17, compressed air attempts to enter the delivery nozzle 36 but is resisted by the equalized system pressure within the tank and by an airlock which is effectively present in the delivery nozzle and is so maintained until demand for working air is initiated by the tools 17.

When air delivery demand begins, the pressure drops in the main line 14. This instantaneously begins the fluid delivery from an overriding of the airlock in the delivery nozzle 36. During the first few seconds of demand there is a momentary drop in air line pressure and consequently there is a higher pressure within the reservoir. This starts the lubricant flow which over rides the capillary or air lock condition in the delivery tube. This results in an initial rich condition of lubricant delivery ensuring that the tools 17 downstream are quickly wetted with lubricant. It has been observed that depending on the volume of working air demanded, the sizing of the fluid particles is automatically performed by the delivery nozzle. As reservoir internal pressure begins to drop, delivery of the lubricant is gradually reduced to a normal feed rate.

During normal continuing operation of the pneumatic tools 17, air is continuously delivered through the line 14 and lubricant is continuously supplied in atomized form through the nozzle 36. The flow of air impacting on the frontal area of the inlet nozzle 32 creates a higher pressure in the reservoir due to the ram effect which constitutes the velocity head. The velocity head changes directly as the flow rate of air volume changes. Sudden drops in the line pressure due to an increasing flow demand of air allows the over pressure within the reservoir to immediately cause a rapid increase of fluid delivery to the airstream. Conversely, during a rapid rise of pressure from a slower flow demand, the delivery nozzle 32 flow is countered by the lower pressure within the reservoir, comparatively. Thus the delivery rate of the lubricant is proportional with the working air flow to the tools 17. Once the unit 10 is adjusted for a given fluid delivery rate during the normal operation condition, the same proportional delivery rate will be maintained at any flow rate within the operating range.

During operation, when the downstream working air requirements are for a lower flow rate, such as when one or more of the tools is turned off, the pressure within the line increases and this leads to a balancing or readjustment of the atomized lubricant delivery.

The lubricating fluid passed through metering valve 41 is a relatively small amount, on the order of about one drop per second. This oil weeps through the support tube 38 rather than completely flooding it. The effect is to maintain in the trapped air in a pocket 48. The trapped air enables the lubricant fluid 34 to vibrate itself into particles for the reason that the faster the air passes the tip of the delivery nozzle 36, best shown in FIG. 4, the larger the wave of vibration or turbulence becomes this effectively throws larger oil particles into the airstream. Without the trapped air 48, it was found that the particles become smaller as velocity increased which would renders the unit almost ineffective. Another way of viewing the matter is that the low pressure at the tip of the delivery nozzle 36 induces high turbulence, as indicated in FIG. 4, which affects the wall or slug of lubricating fluid 34 causing a pulsation or vibration. This wall is supported from behind by the trapped air 48 which extends into the support tube 38. The trapped air functions as a reverberation chamber or cushion and serves to support the back side of the wall of lubricating fluid at the tip of the delivery nozzle 36.

When the demand for working air has been substantially reduced even to zero, there is no air motion with regard to either the air intake 32 or lubricant delivery 36 nozzles. During this condition, the pressure in the system equalizes but the airlock at the discharge nozzle is maintained due to the capillary effect even though no fluid is fed out of the nozzle tip. Through adjustment of the metering valve 41 a very small path on the order of $4/1000$ to $5/10000$-inch exists through the value. It will be recognized that the nozzle has a smaller inner diameter when compared to that of the support tube 38 and this enables the tube to maintain the captured air in the space 48.

While the present invention has been described, with respect to the several drawings those skilled in the art will recognize that various substitutions, omissions, modifications and changes may be made in the apparatus and method of operation disclosed herein without departing from the scope or spirit of this invention. Accordingly, it is intended that the foregoing illustrations and description be considered merely exemplary of the present invention and not a limitation thereof.

What is claimed:

1. An air line oiler serving to furnish an atomized lubricant from a liquid supply thereof into a working air line delivering compressed air to a pneumatic tool including a rock drill, comprising:

a reservoir for said supply of liquid lubricant and equipped for holding the same at the working air line pressure;

a base for supporting said reservoir;

a first air conduit arranged in said base, said conduit serving as a portion of the working airline;

an air inlet nozzle arranged within said first air conduit and oriented to project substantially co-axially into the air stream opposite to the direction of air flow when the oiler is included in the working air line;

a second air conduit in operative communication between said lubricant holding reservoir and said inlet nozzle serving to pressurize said reservoir at the line pressure;

a lubricant delivery nozzle co-axially arranged in said first air conduit and oriented to project substantially in the direction of air flow;

a fluid conduit in operative communication between said lubricant holding reservoir and said delivery nozzle serving to afford lubricant flow to said delivery nozzle;

metering valve means arranged in said fluid conduit serving to permit regulation of the flow of lubricant delivered from said reservoir to the delivery nozzle;

said delivery nozzle having a bore dimension related to the viscosity and surface tension of the lubricant such that the lubricant weeps along the fluid conduit to coalesce inwardly of the nozzle tip, the onrushing air in the first air conduit withdrawing the lubricant from the bore and converting it into an atomized form for entrainment into the working air line for delivery to the pneumatic tool.

2. The air line oiler of claim 1 wherein said reservoir is configured and designed to resist the full line pressure applied by the working air;

a pressure tight filling hatch arranged in an upper portion of said reservoir serving to permit the receipt of lubricant when the reservoir is in an unpressurized condition; the second air conduit extending upwardly in said reservoir and projecting an open end into the upper portion of said reservoir to enable a head of compressed air to reside above the lubricant surface in the pressurized condition.

3. A method of furnishing a flow of atomized lubricant to a pneumatic tool coupled to a working air line delivering compressed air to the tool, including the steps:

providing a supply of tool lubricant in liquid form and maintaining the same at the working air line pressure;

providing an air inlet probe positioned in the working air line so as to intercept both the dynamic and static pneumatic head and providing that pressure head to the liquid lubricant supply;

providing a lubricant atomizing probe positioned in the working air line to project in the direction of air flow;

delivering lubricant from the supply thereof into the atomizing probe in a weeping flow for mixing with the working air, first within the probe, and then being carried into the working air stream in an aerosol form.

4. The method of claim 3 and further including the step of controlling the delivery of liquid lubricant from the supply thereof into the atomizing probe.

5. The method of claim 3 and including the step of providing in the atomizing probe an air lock inwardly of the end of the probe.

6. The method of claim 3 and providing for discontinuous liquid flow from the liquid supply to the tip of the atomizing probe.

7. An airline oiler serving to furnish atomized lubricant from a liquid supply thereof into a working airline delivering compressed air to a pneumatic tool including a rock drill, comprising:

a reservoir for said supply of liquid lubricant and equipped for holding the same at the working airline pressure;

a base for supporting said reservoir;

a first air conduit arranged in said base, said conduit serving as a portion of the working airline;

an air inlet nozzle arranged within said first air conduit and oriented to project substantially co-axially into the air stream opposite to the direction of air flow when the oiler is included in the working airline;

a second air conduit in operative communication between said lubricant holding reservoir and said inlet nozzle serving to pressurize said reservoir at the line pressure;

a lubricant delivery nozzle centrally arranged in said first air conduit and oriented to project substantially in the direction of air flow;

a fluid conduit in operative communication between said lubricant holding reservoir and said delivery nozzle serving to afford lubricant flow to said delivery nozzle;

metering valve means arranged in said fluid conduit serving to permit regulation of the flow of lubricant delivered from said reservoir to the delivery nozzle;

said delivery nozzle having a bore dimension related to the viscosity and surface tension of the lubricant such that the lubricant weeps along the fluid conduit to coalesce inwardly of the nozzle tip, the onrushing air in the first air conduit withdrawing the lubricant from the bore and converting it into an atomized form for entrainment into the working airline for delivery to the pneumatic tool;

means in said reservoir and base providing a sump for retention over time of solid debris precipitated from the lubricant supplied to the reservoir; and a pressure-tight cleanout hatch provided in the lower portion of said oiler permitting removal of the debris when the airline oiler is in an unpressurized condition.

* * * * *